United States Patent [19]
Byers, Jr.

[11] 3,805,840
[45] Apr. 23, 1974

[54] POPPET TYPE PROPORTIONAL VALVE PILOT STAGE

[75] Inventor: James Otto Byers, Jr., Manchester, N.H.

[73] Assignee: Sanders Associates, Nashua, N.H.

[22] Filed: Apr. 3, 1972

[21] Appl. No.: 240,499

[52] U.S. Cl. ............... 137/627.5, 137/636, 251/363
[51] Int. Cl. ............................................. F16k 11/14
[58] Field of Search ........ 137/607, 609, 636, 636.1, 137/627, 627.5

[56] References Cited
UNITED STATES PATENTS

| 3,058,489 | 10/1962 | Corbett | 137/627.5 |
| 1,502,005 | 7/1924 | Allen | 137/609 |
| 2,938,503 | 5/1960 | Laucks | 137/636 |
| 1,583,140 | 5/1926 | Goosmann | 137/510 |
| 637,010 | 11/1899 | Mumford | 137/609 |
| 2,311,827 | 2/1943 | Hansen | 137/607 X |

FOREIGN PATENTS OR APPLICATIONS

| 331,150 | 10/1935 | Italy | 137/627.5 |

*Primary Examiner*—William R. Cline
*Assistant Examiner*—Richard Gerard
*Attorney, Agent, or Firm*—Louis Etlinger; William L. Hunter

[57] ABSTRACT

A hydraulic pilot stage including first and second poppet valves positioned to be urged by pilot pressure into their closed positions and mechanically connected to a torque motor which variably opens one or the other of the valves depending upon the sense of the input signal. Provision is made for adjusting the initial relative position of each valve with respect to its valve seat.

1 Claim, 1 Drawing Figure

PATENTED APR 23 1974
3,805,840
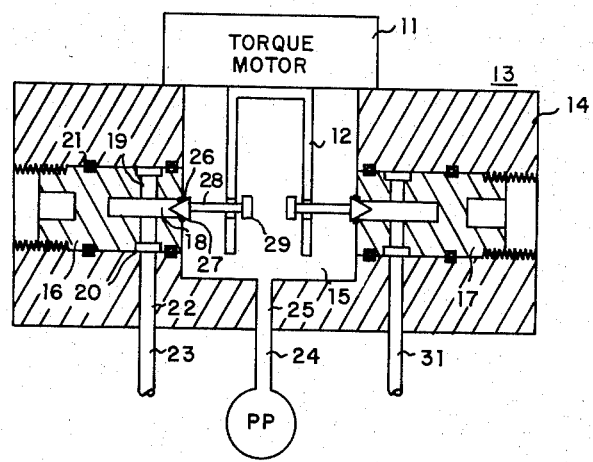

POPPET TYPE PROPORTIONAL VALVE PILOT STAGE

FIELD OF THE INVENTION

This invention relates generally to hydraulic systems and particularly to a valve arrangement suitable for use as the first, or pilot stage of a multiple stage hydraulic control system.

BACKGROUND OF THE INVENTION

A typical multiple stage electro-hydraulic control system has a first or pilot stage which includes a force or torque motor responsive to an input signal to actuate an hydraulic valve so as to generate a control pressure or rate of flow of fluid in one or more conduits which are connected to control a second stage hydraulic valve. One kind of first stage hydraulic valve which has been widely used is a flapper and nozzle arrangement in which fluid under pressure is passed through a nozzle which is variably occluded by a flapper or wand controlled by the torque motor thereby varying the pressure in the conduit upstream of the nozzle, which variation controls the second stage valve. Another kind of first stage valve which has been widely used is the piston and cylinder type in which the piston is moved by the force or torque motor so as to generate the required control pressure or rate of flow. Both of these arrangements, although widely used, are quite expensive to construct. In addition, both are very sensitive to contaminants in the fluid and accordingly require extensive filtering of the fluid used.

It is a general object of the present invention to provide an improved valve arrangement suitable for use at the first stage valve in a multi-stage electro hydraulic control system.

A more specific object is to provide a first stage valve which is both less expensive and less sensitive to contaminants than previously known valves.

SUMMARY OF THE INVENTION

Briefly stated, a valve arrangement incorporating the present invention includes a valve body formed to define a chamber subjected to fluid under pressure and in which are arranged two poppet valves cooperating with passageways at opposite sides of the chamber so as to be urged by the pressure of the fluid into engagement with the rims of the passageways in order to occlude them. A force motor is mechanically connected to lift one or the other of the valves according to the sense of the input signal while leaving the other valve undisturbed. The variable pressure and/or rate of flow in the passageway associated with the valve so lifted may be used to control a second stage valve.

DESCRIPTION OF PREFERRED EMBODIMENT

For a clearer understanding of the invention reference may be made to the following detailed description and the accompanying drawing, the single FIGURE of which is a schematic diagram of a first or pilot stage incorporating the present invention.

Referring now to the drawing, the first stage includes a torque motor 11 mechanically connected to displace a member 12 to the left or right in accordance with the sense of an input signal applied to the motor 11 and by an amount determined by the magnitude of such signal. The first stage also includes a hydraulic valve indicated generally by the reference character 13. The valve 13 includes a valve body 14 formed to define a chamber 15 surrounding the member 12. The valve body 14 is also formed to define first and second generally cylindrical coaxial apertures communicating with the chamber 15 at opposite sides thereof and extending to the exterior of the valve body 14. Generally cylindrical plugs 16 and 17 are threaded into these apertures. These plugs are identical and only one will be described in detail. The plug 16 is formed to define a central axial bore 18 extending from the end of the plug adjacent to the chamber and along the axis of the plug for a portion of its length. This plug is also formed to define a transverse passageway 19 which intersects the bore 18. The plug 16 is also formed to define an annular groove 20 around the outside surface thereof which intersects the transverse passageway 19 at each end thereof. "O" rings 21 are provided on each side of the groove 20 to seal the plug to the body 14. The valve body 14 is also formed to define a passageway 22 extending from the groove 20 to the exterior of the valve body where it is connected to a conduit 23. A conduit 24 is connected to a source PP of pilot pressure and is also connected to an internal passageway 25 formed in the valve body 14 and which extends into the chamber 15. The rim of the bore 18 at its intersection with the chamber 15 may be formed to define or may have pressed therein a valve seat 26 although in some cases such seat may be dispensed with and its purpose served merely by the rim of the bore 18. The valve seat 26 cooperates with a poppet valve 27 positioned within the chamber 15 so as to be urged by the fluid pressure therein against the valve seat 26 with its stem 28 extending approximately coaxial with the bore 18.

The plug 17 is substantially identical to the plug 16 and cooperates with a poppet valve similar to the valve 27. It is preferred that the mechanical connection between the torque motor 11 and the poppet valves be such that an input signal of either sense displaces only one of the valves, leaving the other one undisturbed. This is conveniently accomplished by making the member 12 U shaped and providing apertures in the legs through which the stems of the two valves pass with clearance and by securing these stems on the inside of the U shaped member by means of a cross member 29 such as a cotter pin.

As previously mentioned, both of the plugs 16 and 17 are threaded into the valve body 14 and are initially adjusted to make the relative positions of the valves and their valve seats such that flow is just ready to start should the member 12 be displaced in either direction so as to pull one of the valves off its seat.

When current is applied to the torque motor 11, the member 12 will gradually overcome the pressure PP acting on the poppet valve. When the force of this pressure has been matched, flow will start either to conduit 23 or to the comparable conduit 31 associated with the plug 17, depending upon the direction of the current furnished to the torque motor 11. A further increase in current will cause the selected poppet valve to move off its seat and allow fluid to flow at a rate depending upon the opening of the valve and the pressure difference between that in the chamber 15 and that in the conduit 23 or 31.

When either one of the poppet valves is opened, it will tend to move from side to side in its associated longitudinal passageway because of the flow forces, thus acting as an automatic dither and minimizing the possibility of the valve becoming clogged due to fluid contamination.

It is apparent that a pilot stage in accordance with the present invention is easy and inexpensive to manufacture because it is made from simple parts.

Although a preferred embodiment of the invention has been described in considerable detail for illustrative purposes, many modifications will occur to those skilled in the art. It is threfore desired that the protection afforded by Letters Patent be limited only by the true scope of the appended claims.

What is claimed is:

1. A valve system comprising a valve body formed to define a chamber and also formed to define first and second generally cylindrical coaxial apertures communicating with said chamber at opposite sides thereof and each extending to the exterior of said valve body, first and second generally cylindrically plugs threaded into said first and second apertures respectively, each of said plugs being formed to define;
 1. a central axial bore extending from the end of said plug adjacent the chamber along said axis for a portion of the length of said plug,
 2. a transverse passageway intersecting said axial bore, and
 3. an annular groove around the outside surface of said plug and intersecting said transverse passageway, said body being formed to define first and second auxiliary passageways each intersecting the groove in one of said plugs and each extending to the exterior of said body, said first and second auxiliary passageways being connected to first and second control conduits respectively, said body being also formed to define an additional passageway extending from said chamber to the exterior of said body and being for connection to a source of fluid under pressure, said system also including first and second poppet valves disposed within said chamber and mounted to be urged by the pressure within said chamber towards said plugs so as to occlude said axial bores therein, said system also including means comprising a torque motor responsive to the sense and magnitude of an input signal for selecting and variably urging one of said poppet valves away from its associated plug.

* * * * *